Feb. 25, 1958 — J. R. VARESE ET AL — 2,824,432
LIQUID COOLING SYSTEM
Filed July 26, 1956 — 3 Sheets-Sheet 3
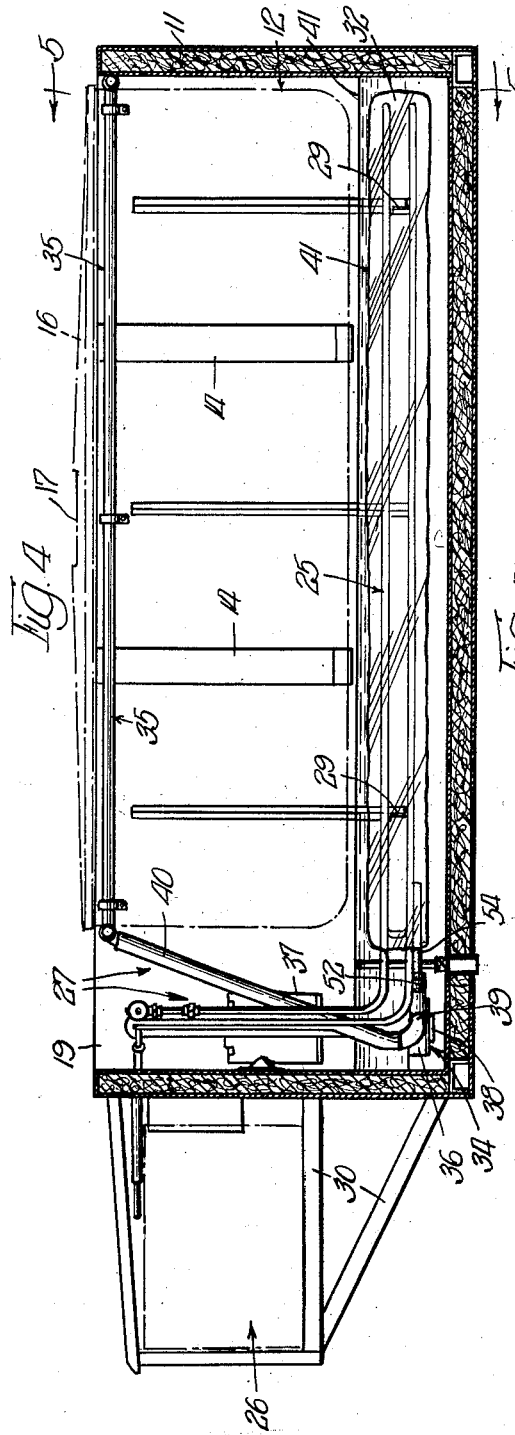
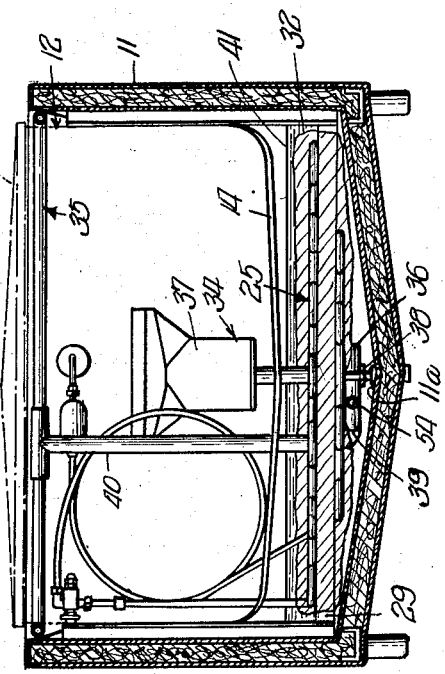
INVENTORS.
John R. Varese,
Clifton D. Wagner,
BY Wilkinson, Huxley, Byron & Hume
ATTYS.

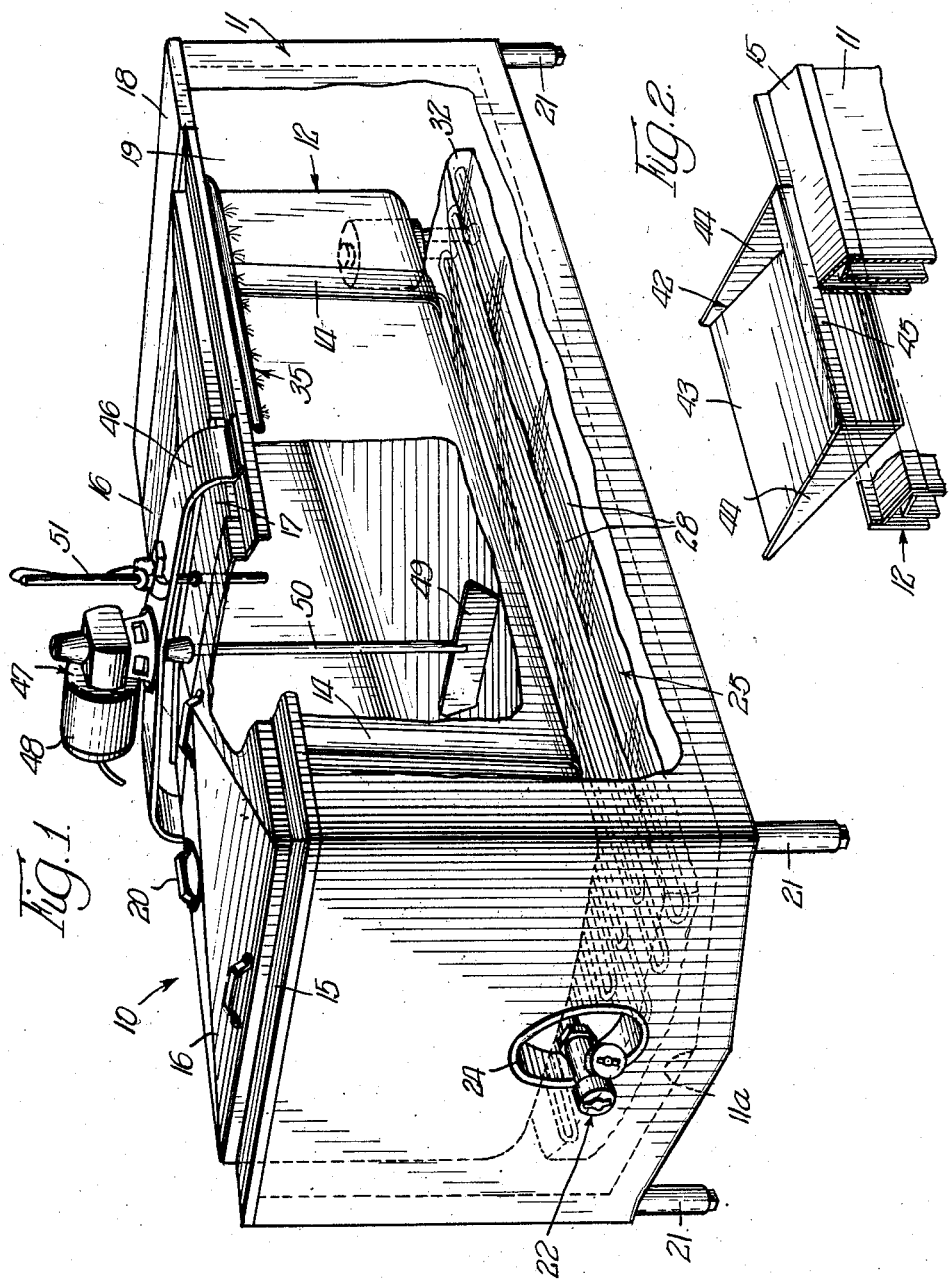

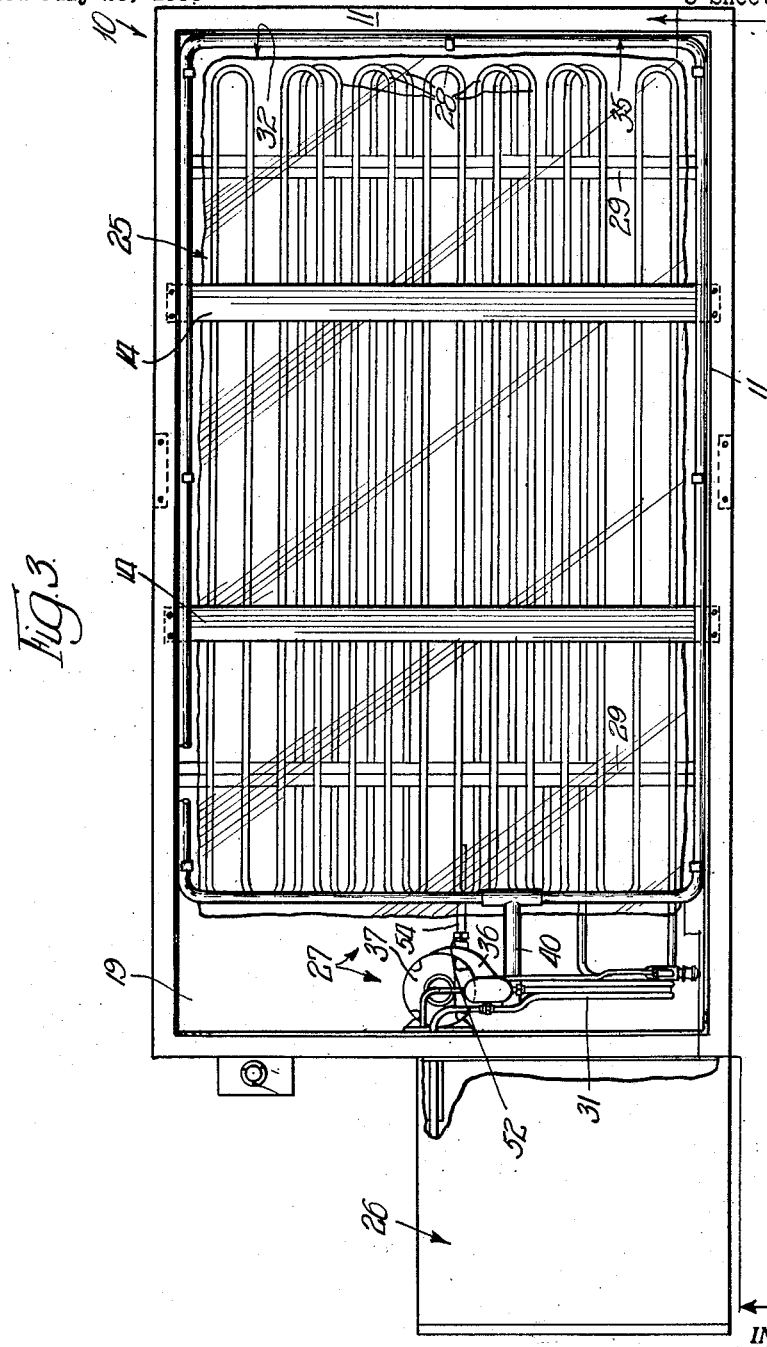

United States Patent Office 2,824,432
Patented Feb. 25, 1958

2,824,432
LIQUID COOLING SYSTEM

John R. Varese, McHenry, and Clifton D. Wagner, Chicago, Ill., assignors to Craft Manufacturing Co., Chicago, Ill., a corporation of Illinois Application July 26, 1956, Serial No. 600,208

10 Claims. (Cl. 62—141)

This invention relates to cooling apparatus utilizing a coolant liquid which is cooled by means of a refrigerating heat exchanger. More particularly, the invention relates to milk cooling storage apparatus in which water, cooled by means of a refrigerating coil, is sprayed on the walls of a milk containing tank for cooling the milk therein.

The cooling apparatus of this invention utilizes what is generally known as the "ice bank method." Ice bank coolers ordinarily utilize an insulated cabinet containing refrigerating coils immersed in water in the bottom, a milk tank supported in the cabinet in spaced relation above the water level, and a water spray system for drawing cooled water from the bottom of the cabinet and for spraying this water against the side walls of the tank. Prior to filling or partially filling the tank with milk the apparatus is precooled to form an ice block about the coils. As the milk is dumped in it is cooled and the milk temperature is maintained slightly over freezing, in order to retard growth of harmful bacteria and to prevent spoiling. Ice bank coolers of this general type are shown in Cann et al. Patent No. 2,713,251 and Markley Patent No. 2,690,061.

One of the major difficulties encountered in ice bank coolers has been the reduction of cooling efficiency as a consequence of improper water circulation about the cooling coils resulting in improper mixing of warmed water dripping from the sides of the tank and uneven melting of the ice block during the milk filling operation. As a consequence of low cooling efficiency, the water coolant often is not maintained at a low enough temperature to cool the incoming milk rapidly enough, and in some instances the temperature of the milk cannot be brought down to a safe level. Furthermore, inefficient utilization of the cooling bank results in considerable power loss and increased time of operation of the unit, thereby increasing the cost of operation and maintenance.

It is an object of the present invention to provide an ice bank type milk cooler embodying means for substantially improving water circulation about the ice bank.

Another object of the invention is to provide improved heat exchange apparatus of the type utilizing a heat exchanger at least partly immersed in a coolant liquid.

A further object of the invention is to provide heat exchange apparatus wherein the heat transfer efficiency between a heat exchanger and an associated heat exchange liquid is substantially improved through utilization of improved liquid circulation means.

Still another object of the invention is to provide improved heat exchange apparatus wherein a liquid flow distribution system is adapted to perform an auxiliary function in improving the circulation about the heat exchanger associated with the liquid.

A still further object of the invention is to provide an improved cooling apparatus wherein liquid coolant circulation about a refrigerating unit is improved through secondary utilization of pumping means which is adapted primarily for distributing cooled liquid to an object to be cooled.

An additional object of the present invention is to provide an improved ice bank type milk cooler wherein the heat transfer efficiency between the water and the refrigerating unit is substantially increased by providing a jet stream of water adjacent the refrigerating coil.

A specific object of the invention is to provide an improved ice bank type milk cooler wherein the liquid coolant distribution pump is utilized to provide a jet stream of coolant adjacent the refrigerating coil bank in order to improve the coolant circulation about the coil bank and to thereby increase the heat transfer efficiency.

Other objects, features and advantages of the present invention will be apparent from the following detailed description taken in conjunction with the accompanying drawings, in which:

Figure 1 is a perspective view of an improved milk cooler according to the present invention, with parts broken away to illustrate the internal arrangement;

Figure 2 is a fragmentary perspective view of a portion of the milk cooler cabinet and tank and showing a milk filler distribution tray for use in the cooler construction shown in Figure 1;

Figure 3 is a top plan view of the milk cooler of Figure 1 with the cover construction and the milk tank removed;

Figure 4 is a sectional view taken along line 4—4 of Figure 3; and

Figure 5 is a sectional view taken along line 5—5 of Figure 4.

In Figure 1 is illustrated milk cooler apparatus 10, which includes an insulated cabinet or housing 11 formed primarily of stainless steel and containing a milk tank 12 suspended in spaced relation on a pair of stainless steel saddles or hanger straps 14 which are secured to the upper edge portion of the cabinet 11. A stainless steel apron 15 is disposed about the upper margin of the cabinet and is secured to the upper edge portion of the tank to provide additional support for the tank. The bottom of the cabinet 11 is slanted downwardly from the sides toward the middle to form a longitudinal V-bottom or trough 11a to increase the water supply capacity within the cabinet and to induce gravity circulation of the water in the cabinet.

The apron 15 is pitched outwardly as shown to shed moisture, dirt, etc. and covers the space between the tank and the cabinet. Removable stainless steel covers 16, 16 and a removable stainless steel center deck 17 cover the tank 12. A removable stainless steel end cover 18 is disposed over an end compartment 19 within one end portion of the cabinet. A plurality of removable stainless steel lids 20 (one shown), are provided over filler openings in the covers 16 for use when milk is dumped into the tank. A plurality of adjustable stainless steel legs 21 are secured to the bottom marginal portion of the cabinet for supporting the same in level position.

A sanitary tank outlet valve 22, formed of stainless steel, is connected to the bottom end portion of the tank and extends out of the cabinet 11 through an aperture 24 at one end.

For cooling milk introduced into the tank 12 an ice bank pipe cooling system is utilized and includes a refrigerating heat exchanger 25, power apparatus 26, and a coolant distribution or circulating system 27.

The refrigerating heat exchanger 25 includes a plurality of evaporator coils 28 which are arranged lengthwise in spaced relation beneath the bottom of the tank 12 and above the bottom of the compartment 11. The refrigerating coil bank is formed in two layers of coils both of which are supported on transverse Z-channels 29. The refrigerating coil bank is substantially co-extensive with the area covered by the tank 12.

The cooling power unit 26 may be any suitable type of power driven refrigeration compressor or the like and is supported in a compressor mount 30 which is secured externally of the cabinet 11 at its end opposite to the tank drain valve 22. The refrigerating coil bank 25 is connected to the refrigerating unit 26 by means of refrigerant lines or conduits 31. It will be understood that a suitable refrigerant is compressed by the power unit 26 and is circulated and evaporated in the coils 28 to cool the coils in the conventional manner. The power unit 26 is of sufficient cooling capacity to form a solid ice block 32 about the entire refrigerating coil bank 25 when the coils are immersed in water.

The coolant circulating system 27 includes a liquid pump assembly 34 disposed in the compartment 19 and a liquid tank spray tube or distribution manifold 35 encircling the tank 12. The pump assembly 34 comprises a pump 36 located in the central portion of the compartment 19 slightly lower than the coil bank 25 and connected for being driven by a power unit such as an electric motor 37. The motor 37 is secured to the inner end wall of the compartment 19 above the pump 36 and higher than the level of the bottom of the tank 12. The pump 36 includes a bottom inlet 38 communicating with the bottom trough portion 11a of the cabinet and an outlet 39 which is connected by means of a feed tube 40 to the spray tube 35. The spray tube 35 completely encircles the top edge portion of the tank 12 and is provided with a plurality of closely spaced spray nozzles (not shown) adapted for spraying liquid against the side walls of the tank as illustrated in Figure 1.

When the cooling apparatus is properly arranged as shown and described, liquid coolant in the form of water is introduced into the bottom portion of the cabinet 11 up to a level 41 which is below the bottom of the tank 12 but above the coil bank 25. Preferably the water level is approximately two-thirds of the distance between the coil bank and the bottom of the tank up from the coil bank. When the pump and the refrigerant power unit are operated the coil bank 25 cools the water in the cabinet and the pump directs cooled water to the spray tube 35 which sprays the water on the walls of the tank 12 to cool the walls.

For cooling the milk as it is dumped into the tank 12 a baffle unit or shock cooler tray 42 formed of stainless steel is provided. The tray 42 comprises a slanted bottom 43, upstanding triangular sides 44 and a hanging lip 45. The lip 45 is adapted to engage over the upper marginal edge portion of the tank with the slanted bottom 43 directly below one of the filler openings in the covers 16 covered by the lids 20. Thus, when milk is introduced into the tank through one of the filler openings, the milk is directed against the cold wall of the tank and is spread in a thin sheet since it must pass between the edge of the tray bottom 43 and the adjacent portion of the tank wall. Consequently the warm milk introduced into the tank is immediately cooled. The shock cooler tray 42 is extremely simple in construction and is readily removed for cleaning and for replacement under different filler openings.

A stainless steel removable support bridge or bracket 46 is disposed over the center deck 17. An agitator 47 is provided which includes an electric motor 48 mounted on the bracket 46 and a stainless steel agitator paddle 49 connected for being driven by the motor through a stainless steel shaft 50 which extends through a suitable aperture in the deck 17. The agitator paddle is disposed near the bottom of the tank, and when the agitator motor is energized the paddle rotates to thoroughly mix the milk contained within the tank to insure that a uniformly low temperature is maintained throughout. For accurately recording the amount of milk contained in the tank an electric measuring device 51 of any suitable type is secured on the bracket 46 and has a sensing portion extending through the center deck 17 into the tank.

According to the present invention means are provided for circulating the water within the bottom portion of the cabinet 11 around the refrigerating coil bank 25 in order to substantially increase the heat transfer efficiency from the water to the coils and to the ice block formed thereabout. In order to efficiently perform the circulating function while eliminating the need for an additional power supply, the cooling apparatus of the present invention takes advantage of the existing capacity of the pump 36. To do so an auxiliary outlet 52 is provided in the pump housing periphery, and a jet stream tube or nozzle 54 is connected to the auxiliary outlet and is disposed immediately below the refrigerating coil bank 25. It will be noted that the jet tube 54 is located substantially in the center of the cabinet above the V-bottom trough 11a and is directed longitudinally of the coil bank so that a high speed jet stream of water is directed immediately below the refrigerating coil bank and the ice block formed thereon.

In operating the coiling apparatus of the present invention, the unit is precooled before loading to form a substantial ice block as illustrated in the drawings. As the warm milk is dumped into the tank, the heat from the milk is transferred through the metallic tank walls to the water which is sprayed on the outside thereof. The warmed water dripping from the walls of the tank is thoroughly mixed with the ice water in the bottom of the cabinet and is efficiently circulated about the refrigerating coil bank by the jet stream circulation system so that the mixture is rapidly cooled to a temperature slightly over freezing. As the loading of the tank with milk is continued, the ice block diminishes in thickness and eventually much of the ice is melted. If the tank is completely filled with warm milk on a warm summer day, the ice bank may be melted to a point where the individual coils of the refrigerating coil bank 25 are separated although for the most part still individually coated with ice. The agitator 47 continually operates as the loading and cooling progresses. As soon as all of the milk within the tank reaches the desired temperature, in the range of 35 to 40° F., the cooling apparatus may be turned off except for occasional short runs to maintain the milk at the necessary temperature level as it is stored.

The jet stream below the ice block causes general circulation and agitation of the water under the ice block toward the opposite end of the cabinet and then up at the end and in a reverse direction above the ice block. The water flow is quite turbulent, particularly near the jet stream. The forced circulation of the coolant water together with the induced turbulence greatly increase the heat transfer efficiency and cause the ice block about the cooling coils to be evenly melted as cooling of the warm incoming milk continues. Thus, the capacity of the cooling coil bank and the capacity of the compressor are efficiently utilized and the temperature of the water delivered to the distribution manifold 35 is maintained close to freezing.

It has been found that provision of the jet stream circulation drastically decreases the milk cooling time by 25% to 33% and at the same time the power required to run the entire unit is reduced, the increased cooling efficiency more than making up for the power required to form the jet stream.

The milk cooler illustrated includes an automatic temperature control system (not shown) which de-energizes the motor driven compressor, the pump assembly and the agitator when the milk reaches the desired storage temperature. If the milk warms to the upper limit of the storage temperature range, the automatic temperature control system again activates the compressor, the pump and the agitator to maintain the temperature of the milk at the desired safe level.

It will be understood that the present invention provides an improved ice bank type milk cooling device which is substantially improved over prior art devices of this type and which quickly, efficiently and sanitarily cools milk introduced into the tank and maintains the reduced temperatureas long as the milk remains therein. The cooling efficiency of the apparatus is greatly increased by providing a jet stream system for forced turbulent circulation about the refrigerating coil bank and the ice block formed therearound. The jet stream for the circulating system is efficiently provided by the coolant circulating pump through an auxiliary outlet and a jet tube connected thereto.

Modifications and variations may be effected without departing from the scope of the novel concepts of the present invention.

We claim:

1. A cooling apparatus adapted for utilizing a coolant liquid comprising an insulated housing, a tank suspended in spaced relation in said housing, a cooling coil bank in said housing below said tank and immersed in the cooling liquid, means cooling said coil bank, circulating means for drawing coolant liquid from below said coil bank and for spraying the liquid on said tank, said circulating means including a device for producing a jet stream of coolant along said coil bank in close proximity therewith to increase the rate of heat transfer from the liquid to the coil bank.

2. Heat exchange apparatus adapted for utilizing a heat exchange liquid comprising an insulated housing, a tank suspended in spaced relation in said housing, a heat exchanger immersed in said heat exchange liquid for heat transfer therebetween, means for impinging said liquid on said tank for heat transfer therebetween, and means adjacent one end of the heat exchanger for producing a submerged jet stream of liquid below said tank and along said heat exchanger in close enough proximity therewith to substantially increase the heat transfer efficiency between the liquid and the heat exchanger.

3. Heat exchange apparatus adapted for utilizing a heat exchange liquid comprising a tank, a container for said heat exchange liquid, a heat exchanger immersed in the liquid, and a circulating system for passing said liquid across said tank and said heat exchanger whereby said liquid provides a heat transfer medium between the tank and the heat exchanger, said circulating system including liquid jet flow means submerged in said liquid adjacent one end of said heat exchanger below said tank and associated closely enough to said heat exchanger to substantially increase the heat transfer efficiency between the liquid and the heat exchanger.

4. In heat exchange apparatus for transferring heat between an object and a heat exchanger immersed in the liquid supply, liquid circulating means comprising a liquid distributing system for impinging liquid on said object, and a pump having an inlet communicating with said liquid supply and an outlet communicating with said distributing system for delivering liquid to the distribution system, said pump having an auxiliary outlet for delivering a submerged jet stream of liquid adjacent one end of said heat exchanger below said tank and close enough to force substantially agitated circulation of liquid about the heat exchanger.

5. In heat exchange apparatus for transferring heat between an object and a heat exchanger at least partially immersed in a liquid supply, liquid circulating means comprising a liquid distribution system encircling said object for impinging liquid against a substantial portion of the surface of the object, a pump having an inlet communicating with said liquid supply and an outlet communicating with said distribution system, said pump having an auxiliary outlet independent of said liquid distribution system and said first named outlet communicating with said liquid supply in close enough association with said heat exchanger for agitating the liquid adjacent said heat exchanger to substantially increase the heat transfer efficiency, said auxiliary outlet being submerged in said liquid supply adjacent one end of said heat exchanger below said tank, and means for returning the liquid impinged against said object to said liquid supply.

6. In heat exchange apparatus including a heat exchanger immersed in a liquid supply and a pump system arranged to draw liquid from the liquid supply and to impinge liquid against an object disposed over the liquid supply, the improvement comprising means adjacent one end of the heat exchanger for producing a submerged jet stream of liquid below said tank and along said heat exchanger in close enough association therewith for agitating the liquid to substantially increase the heat transfer efficiency between the liquid and the heat exchanger.

7. In heat exchange apparatus including a heat exchanger immersed in a liquid supply and a pump system arranged to pump liquid from the liquid supply and to impinge liquid against an object disposed over the liquid supply, the improvement comprising an auxiliary outlet formed on said pump system for directing a jet stream of liquid adjacent said heat exchanger parallel thereto and along the longest dimension thereof to force liquid circulation about the heat exchanger for increasing the heat transfer efficiency.

8. A milk cooling apparatus adapted for utilizing water as a coolant liquid comprising an insulated cabinet, a tank for containing milk disposed in spaced relation in said cabinet, a refrigerating heat exchanger disposed in said cabinet below said tank in spaced relation between the bottom of the tank and the bottom of the container and immersed in water, water spray means disposed adjacent the upper portion of said tank, a pump in said cabinet having an inlet immersed in water and having an outlet communicating with said water spray means, and jet flow means in said cabinet submerged in said water adjacent one end of said heat exchanger below said tank and associated closely enough with said heat exchanger for inducing circulation of water about said heat exchanger to substantially increase the heat transfer efficiency from the water to the heat exchanger.

9. In a cooling apparatus including an insulated housing adapted for containing cooling liquid, a tank containing a substance to be cooled and disposed in spaced relation in the housing above said liquid, a refrigerating heat exchanger immersed in the liquid in said housing and disposed in spaced relation between the bottom of the tank and the bottom of the housing, liquid spray means disposed adjacent said tank, a pump having an inlet communicating with the water in said housing and an outlet communicating with said liquid spray means, and an auxiliary outlet formed on said pump communicating with the water in the housing adjacent said heat exchanger for inducing turbulence in the water about the heat exchanger.

10. A milk cooling apparatus comprising an insulated cabinet adapted for containing water in the lower portion thereof, a metallic tank disposed in spaced relation in said cabinet above the water in the cabinet, a water spray manifold encircling the upper edge portion of said tank and having spray means adapted for directing a plurality of streams of water against the outside walls of the tank, a pump assembly including a pump immersed in the water in said cabinet and a motor connected for driving the pump disposed above the water in the cabinet, said pump having an inlet communicating with the water in the cabinet and primary and secondary outlets, conduit means connecting said primary outlet to said water spray manifold, refrigerating means including a bank of refrigerating coils immersed in the water in the cabinet and disposed below said tank and a refrigerating power unit adapted for reducing the temperature of said coils below the freezing point of water to form an ice block about said coils, and a jet stream tube connected to the secondary outlet of said pump and disposed adjacent said coil bank for directing a jet stream of water under the coil bank and generally parallel to the longest dimension thereof to provide a forced turbulent circulation about the coil bank to increase the heat transfer efficiency from the water to the coil bank.

References Cited in the file of this patent

UNITED STATES PATENTS

| | | |
|---|---|---|
| 2,056,970 | Leopold | Oct. 13, 1936 |
| 2,211,527 | Straub | Aug. 13, 1940 |
| 2,256,971 | Chamberlain | Sept. 23, 1941 |
| 2,618,127 | Shipman | Nov. 18, 1952 |
| 2,713,251 | Cann et al. | July 19, 1955 |